United States Patent
Asay et al.

(10) Patent No.: US 10,180,000 B2
(45) Date of Patent: Jan. 15, 2019

(54) COMPOSITE LATTICE BEAM

(71) Applicants: Brandon Asay, Lindon, UT (US); David W Jensen, Mapleton, UT (US)

(72) Inventors: Brandon Asay, Lindon, UT (US); David W Jensen, Mapleton, UT (US)

(73) Assignee: ISOTRUSS INDUSTRIES LLC, Orem, UT (US)

( * ) Notice: Subject to any disclaimer, the term of this patent is extended or adjusted under 35 U.S.C. 154(b) by 0 days.

(21) Appl. No.: 15/912,425

(22) Filed: Mar. 5, 2018

(65) Prior Publication Data

US 2018/0258642 A1   Sep. 13, 2018

Related U.S. Application Data

(60) Provisional application No. 62/467,656, filed on Mar. 6, 2017.

(51) Int. Cl.
*E04C 3/29* (2006.01)
*E04C 3/28* (2006.01)
(Continued)

(52) U.S. Cl.
CPC .............. *E04C 3/28* (2013.01); *B29C 70/24* (2013.01); *B29C 70/54* (2013.01); *E04B 1/19* (2013.01); *E04C 3/08* (2013.01); *E04C 3/29* (2013.01); *B29K 2063/00* (2013.01); *B29K 2307/04* (2013.01); *B29L 2031/10* (2013.01); *E04B 2001/1933* (2013.01); *E04C 2003/0443* (2013.01); *E04C 2003/0486* (2013.01); *E04C 2003/0495* (2013.01)

(58) Field of Classification Search
CPC ..... E04C 3/29; E04C 3/00; E04C 3/02; E04C 3/28; E04C 3/46; E04C 2003/0486; E04C 2003/0491; E04C 2003/0495; Y10T 428/24058
See application file for complete search history.

(56) References Cited

U.S. PATENT DOCUMENTS 3,798,864 A * 3/1974 Georgii ................... E04C 5/065
52/223.14
4,686,134 A * 8/1987 Ono ....................... B29C 70/207
428/105
(Continued)

*Primary Examiner* — Adriana Figueroa
*Assistant Examiner* — Jessie T Fonseca
(74) *Attorney, Agent, or Firm* — Dodd Call Black, PLLC; Dustin Call

(57) ABSTRACT

A composite lattice beam. The composite lattice beam includes four or more longitudinals. The four or more longitudinals are parallel to one another, comprise the four corners of a rectangle and include a tow, where the tow includes a bundle of untwisted fibers. The composite lattice beam also includes one or more outer diagonals. The one or more outer diagonals vary in two dimensions and include a tow, where the tow includes a bundle of untwisted fibers. The composite lattice beam further includes one or more inner diagonals. The one or more inner diagonals vary in three dimensions and include a tow, where the tow includes a bundle of untwisted fibers. The composite lattice beam additionally includes one or more nodes. The nodes are each an interweaving of at least one of the four or more longitudinals, at least one of the one or more outer diagonals and at least one of the one or more inner diagonals.

20 Claims, 4 Drawing Sheets

(51) Int. Cl.
*E04C 3/08* (2006.01)
*E04B 1/19* (2006.01)
*B29C 70/24* (2006.01)
*B29C 70/54* (2006.01)
*E04C 3/04* (2006.01)
*B29K 63/00* (2006.01)
*B29K 307/04* (2006.01)
*B29L 31/10* (2006.01)

(56) References Cited

U.S. PATENT DOCUMENTS

| | | | | |
|---|---|---|---|---|
| 5,197,254 | A * | 3/1993 | Smith | A47C 9/105 |
| | | | | 428/11 |
| 7,132,027 | B2 * | 11/2006 | Jensen | B29C 53/564 |
| | | | | 156/175 |
| 9,404,249 | B2 * | 8/2016 | Langone | E04B 1/30 |
| 2005/0115186 | A1 * | 6/2005 | Jensen | A45F 3/04 |
| | | | | 52/633 |
| 2009/0193961 | A1 * | 8/2009 | Jensen | B29C 53/564 |
| | | | | 87/8 |
| 2014/0182232 | A1 * | 7/2014 | Holt | B29C 70/56 |
| | | | | 52/645 |

* cited by examiner

COMPOSITE LATTICE BEAM

CROSS-REFERENCE TO RELATED APPLICATIONS

This application claims the benefit of and priority to U.S. Provisional Patent Application Ser. No. 62/467,656 filed on Mar. 6, 2018, which application is incorporated herein by reference in its entirety.

BACKGROUND OF THE INVENTION

The pursuit of structurally efficient structures in the civil, mechanical, aerospace and sports arenas is an ongoing quest. An efficient truss structure is one that has a high strength to weight ratio and/or a high stiffness to weight ratio. An efficient truss structure can also be described as one that is relatively inexpensive, easy to fabricate and assemble, and does not waste material.

Increasingly, composites are seen as having the potential to replace many other structural elements. Depending on the use, composites provide greater strength and flexibility, but are more expensive than conventional materials such as wood or steel. Therefore, the replacement of conventional materials with composites is seen as beneficial, but impractical and thus their adoption in construction has been quite slow.

Therefore, there is a need in the art for a composite beam that has a high strength to weight ratio, to reduce the amount of composite material used. Further, there is a need for the design of the beam to reduce or eliminate unneeded materials by utilizing a geometry which minimizes the amount of composite used while retaining as much strength as possible.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a composite lattice beam. The composite lattice beam includes four or more longitudinals. The four or more longitudinals are parallel to one another, comprise the four corners of a rectangle and include a tow, where the tow includes a bundle of untwisted fibers. The composite lattice beam also includes one or more outer diagonals. The one or more outer diagonals vary in two dimensions and include a tow, where the tow includes a bundle of untwisted fibers. The composite lattice beam further includes one or more inner diagonals. The one or more inner diagonals vary in three dimensions and include a tow, where the tow includes a bundle of untwisted fibers. The composite lattice beam additionally includes one or more nodes. The nodes are each an interweaving of at least one of the four or more longitudinals, at least one of the one or more outer diagonals and at least one of the one or more inner diagonals.

Another example embodiment includes a composite lattice beam. The composite lattice beam includes a first bay and a second bay, where a first end of the second bay is attached to a second end of the first bay. The composite lattice beam also includes a first end cap on a first end of the first bay, where the first end of the first bay is opposite the second end of the first bay, and a second end cap on a second end of the second bay, where the second end of the second bay is opposite the first end of the second bay. The composite lattice beam further includes a first longitudinal. The first longitudinal extends from the first end cap to the second end cap through the first bay and the second bay and includes a tow, where the tow includes a bundle of untwisted fibers intermixed with a resin. The composite lattice beam additionally includes a second longitudinal. The second longitudinal is parallel to the first longitudinal, extends from the first end cap to the second end cap through the first bay and the second bay and includes a tow, where the tow includes a bundle of untwisted fibers intermixed with a resin. The composite lattice beam moreover includes a third longitudinal. The third longitudinal is parallel to each of the first longitudinal and the second longitudinal, extends from the first end cap to the second end cap through the first bay and the second bay and includes a tow, where the tow includes a bundle of untwisted fibers intermixed with a resin. The composite lattice beam also includes a fourth longitudinal. The fourth longitudinal is parallel to each of the first longitudinal, the second longitudinal and the third longitudinal, extends from the first end cap to the second end cap through the first bay and the second bay, and includes a tow, where the tow includes a bundle of untwisted fibers intermixed with a resin. The composite lattice beam further includes a fifth longitudinal. The fifth longitudinal is parallel to each of the first longitudinal, the second longitudinal, the third longitudinal and the fourth longitudinal, extends from the first end cap to the second end cap through the first bay and the second bay, and includes a tow, where the tow includes a bundle of untwisted fibers intermixed with a resin. The composite lattice beam additionally includes a sixth longitudinal. The sixth longitudinal is parallel to each of the first longitudinal, the second longitudinal, the third longitudinal, the fourth longitudinal and the fifth longitudinal, extends from the first end cap to the second end cap through the first bay and the second bay and includes a tow, where the tow includes a bundle of untwisted fibers intermixed with a resin. The first longitudinal, second longitudinal, third longitudinal, fourth longitudinal, fifth longitudinal and sixth longitudinal have a rectangular cross-section, where the first longitudinal forms a first corner of the rectangular cross-section, the second longitudinal forms a second corner of the rectangular cross-section, the third longitudinal forms a third corner of the rectangular cross-section, the fourth longitudinal forms a fourth corner of the rectangular cross-section, the fifth longitudinal is on a first edge of the rectangular cross-section formed by the first corner and the second corner of the rectangular cross-section, and the sixth longitudinal is on a second edge of the rectangular cross-section formed by the third corner and the fourth corner of the rectangular cross-section. The composite lattice beam moreover includes a first outer diagonal. The first outer diagonal includes a tow, where the tow includes a bundle of untwisted fibers intermixed with a resin, extends from a node at the intersection of the first end cap and the first longitudinal to a node at the intersection of the first bay, the second bay and the second longitudinal and passes through the fifth longitudinal. The composite lattice beam also includes a second outer diagonal. The second outer diagonal includes a tow, where the tow includes a bundle of untwisted fibers intermixed with a resin, extends from a node at the intersection of the first end cap and the second longitudinal to a node at the intersection of the first bay, the second bay and the first longitudinal, and passes through the fifth longitudinal. The composite lattice beam further includes a third outer diagonal. The third outer diagonal includes a tow, where the tow includes a bundle of untwisted fibers intermixed with a resin, extends from a node at the intersection of the second end cap and the first longitudinal to the node at the intersection of the first bay, the second bay and the second longitudinal and passes through the fifth longitudinal. The composite lattice beam additionally includes a fourth outer diagonal. The fourth outer diagonal includes a tow, where the tow includes a bundle of untwisted fibers intermixed with a resin, extends from a node at the intersection of the second end cap and the second longitudinal to the node at the intersection of the first bay, the second bay and the first longitudinal and passes through the fifth longitudinal. The composite lattice beam moreover includes a first inner diagonal. The first inner diagonal includes a tow, where the tow includes a bundle of untwisted fibers intermixed with a resin and extends from the node at the intersection of the first end cap and the first longitudinal to a node at the intersection of the first bay, the second bay and the sixth longitudinal. The composite lattice beam also includes a second inner diagonal. The second inner diagonal includes a tow, where the tow includes a bundle of untwisted fibers intermixed with a resin and extends from a node at the intersection of the first end cap and the fifth longitudinal to a node at the intersection of the first bay, the second bay and the third longitudinal. The composite lattice beam further includes a third inner diagonal. The third inner diagonal includes a tow, where the tow includes a bundle of untwisted fibers intermixed with a resin and extends from the node at the intersection of the first end cap and the fifth longitudinal to a node at the intersection of the first bay, the second bay and the fourth longitudinal. The composite lattice beam additionally includes a fourth inner diagonal. The fourth inner diagonal includes a tow, where the tow includes a bundle of untwisted fibers intermixed with a resin and extends from the node at the intersection of the first end cap and the second longitudinal to the node at the intersection of the first bay, the second bay and the sixth longitudinal. The composite lattice beam moreover includes a fifth inner diagonal. The fifth inner diagonal includes a tow, where the tow includes a bundle of untwisted fibers intermixed with a resin and extends from a node at the intersection of the first end cap and the third longitudinal to a node at the intersection of the first bay, the second bay and the fifth longitudinal. The composite lattice beam also includes a sixth inner diagonal. The sixth inner diagonal includes a tow, where the tow includes a bundle of untwisted fibers intermixed with a resin and extends from a node at the intersection of the first end cap and the sixth longitudinal to the node at the intersection of the first bay, the second bay and the first longitudinal. The composite lattice beam further includes a seventh inner diagonal. The seventh inner diagonal includes a tow, where the tow includes a bundle of untwisted fibers intermixed with a resin and extends from the node at the intersection of the first end cap and the sixth longitudinal to the node at the intersection of the first bay, the second bay and the second longitudinal. The composite lattice beam additionally includes an eighth inner diagonal. The eighth inner diagonal includes a tow, where the tow includes a bundle of untwisted fibers intermixed with a resin and extends from a node at the intersection of the first end cap and the fourth longitudinal to the node at the intersection of the first bay, the second bay and the fifth longitudinal. Each node includes an interweaving of all tows that intersect at the node and each tow and each node are consolidated after interweaving. Consolidation of each tow and each node includes applying radial pressure to eliminate gaps between fibers and curing the resin.

Another example embodiment includes a method for producing a composite lattice beam. The method includes providing four or more unconsolidated longitudinals in a rectangular pattern. The four or more longitudinals are parallel to one another, comprise the four corners of a rectangle and each include a tow, where the tow includes a bundle of untwisted fibers intermixed with a resin. The method also includes interweaving multiple unconsolidated diagonals with the four or more longitudinals. The multiple unconsolidated diagonals include one or more outer diagonals. The one or more outer diagonals vary in two dimensions and each include a tow, where the tow includes a bundle of untwisted fibers intermixed with a resin. The multiple unconsolidated diagonals also include one or more inner diagonals. The one or more inner diagonals vary in three dimensions and each include a tow, where the tow includes a bundle of untwisted fibers. Each point of interweaving between the longitudinal and one or more of the multiple diagonals forms a node. The method additionally includes consolidating each of the tows and each node after interweaving. Consolidating each of the tows and each node includes applying a wrap to each of the tows and each node and applying heat to the wrap, causing the wrap to shrink. The shrinkage of the wrap applies radial pressure to eliminate gaps between fibers. The method moreover includes curing the resin.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
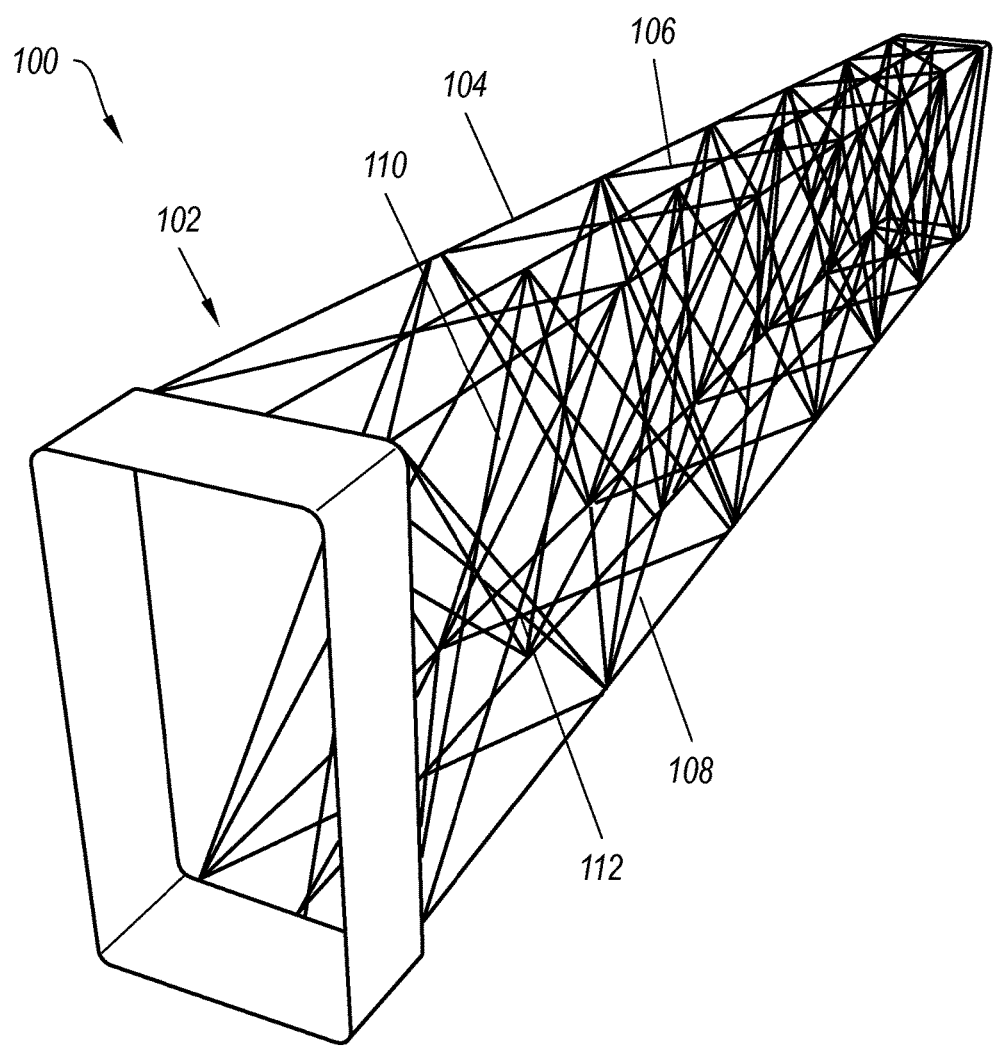
FIG. 1A illustrates an isometric view of the example of a composite lattice beam.
Figure 1B:
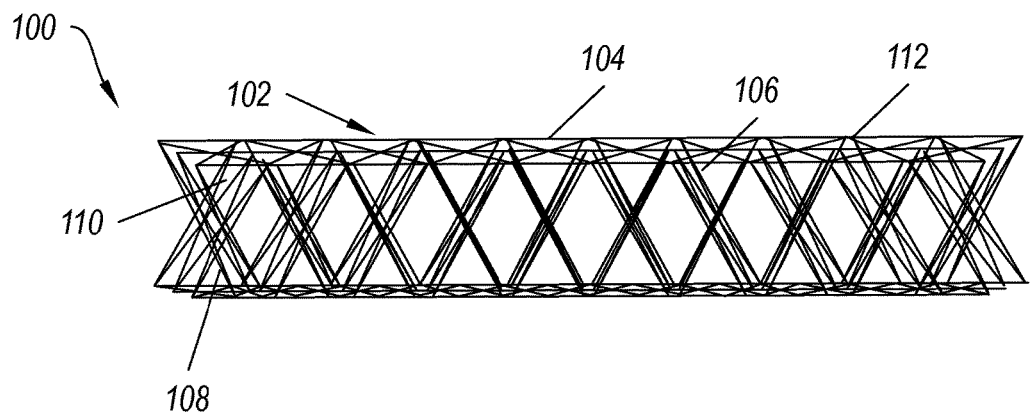
FIG. 1B illustrates a side view of the example of a composite lattice beam.

FIGS. 1A and 1B (collectively "FIG. 1") illustrate an example of a composite lattice beam 100. FIG. 1A illustrates an isometric view of the example of a composite lattice beam 100; and FIG. 1B illustrates a side view of the example of a composite lattice beam 100. The composite lattice beam 100 can be used in the construction of, for example, buildings, aircraft, vehicles, and other structures. Compared to other composite beams, the composite lattice beam 100 can be just as strong while using less composites. Because 90% of the manufacturing cost is materials cost, reducing the amount of composites is a significant improvement relative to the prior art. Further, the fact that the composite lattice beam 100 can be formed in any desired shape means that the composite lattice beam 100 can be directly substituted for steel or wood beams or any other desired beam.

FIG. 1 shows that the composite lattice beam 100 can include one or more bays 102. The bays 102 are repeatable elements that are attached to one another. Each bay 102 is attached to neighboring bays 102 and force is transmitted among the bays 102. Thus, the length of the composite lattice beam 100 is dependent on the length of each bay and the total number of bays 102.

FIG. 1 shows that the composite lattice beam 100 can include four or more longitudinals 104. The longitudinals 104 are straight members which run parallel to the major axis of the composite lattice beam 100 and to one another. I.e., the composite lattice beam 100 can include a rectangular cross-section, with the longitudinals 104 forming the corners. In addition, more longitudinals 104 can be used for greater strength. If additional longitudinals 104 are present, then the rectangular cross-section is preserved. I.e., the additional longitudinals 104 will also run along the "faces" of the rectangle if more than four longitudinals 104 are present. The longitudinals 104 can be primarily responsible for the bending and axial strength of the composite lattice beam 100.

FIG. 1 also shows that the composite lattice beam 100 can include multiple diagonals 106. The diagonals 106 vary in two or three dimensions, whereas the longitudinals 104 vary only in a single dimension. I.e., if the longitudinals 104 are defined as parallel to an x-axis then the diagonals are not parallel to any of an x-axis, y-axis or z-axis but may be present entirely in any one of the x-y, y-z or x-z planes (or planes parallel thereto). In addition, the diagonals 106 will always have other diagonals 106 that are not parallel (though one of skill in the art will appreciate that there may also be diagonals 106 that are parallel to one another). The diagonals 106 dominantly carry shear and torsional forces as well as assisting with lateral stability of the longitudinals 104.

FIG. 1 further shows that some of the diagonals 104 can be defined as outer diagonals 108. The outer diagonals 108 are found along the outside "surfaces" (i.e., what would be the surface of the beam if the beam were a rectangular solid with edges formed by the longitudinals 104). The outer diagonals 108 vary only in two dimensions. I.e., if the longitudinals 104 are defined as parallel to an x-axis, then the outer diagonals are present entirely in any one of the x-y, y-z or x-z planes (or planes parallel thereto). The outer diagonals 108 function primarily to provide lateral stability of the longitudinals 104.

FIG. 1 additionally shows that some of the diagonals 104 can be defined as inner diagonals 110. The inner diagonals are found entirely within the interior of the composite lattice beam 100. The inner diagonals 110 vary in all three dimensions. I.e., if the longitudinals 104 are defined as parallel to an x-axis, then the outer diagonals are not present entirely in any one of the x-y, y-z or x-z planes (or planes parallel thereto). The inner diagonals 110 function primarily to carry shear and torsional forces.

FIG. 1 moreover shows that the composite lattice beam 100 can include nodes 112. The nodes 112 are points where the members 202 (longitudinals 104 and the diagonals 106 or multiple diagonals 106) meet one another. I.e., the nodes 112 are where the longitudinals 104 and the diagonals 106 (or multiple diagonals 106) intersect with one another. One of skill in the art will appreciate that the nodes 112 need not occur at the edges of bays 102, but may instead also occur within bays 102.

FIG. 1 also shows that the composite lattice beam 100 can include an end cap 114. The end cap 114 is attached to each of the longitudinals 104 and may be attached to some of the diagonals 106. In addition, the end cap 114 can allow attachment of multiple composite lattice beams 100 to one another. I.e., the end cap 114 can allow transfer of forces from a first composite lattice beam 100 to a second composite lattice beam 100.

Figure 2:
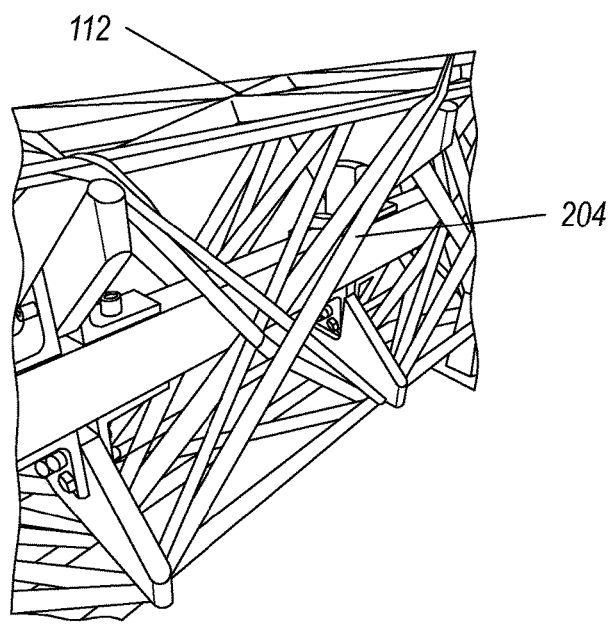
FIG. 2 illustrates an example of a node.

FIG. 2 illustrates an example of a node 112. The node 112 is a joint where multiple members (i.e., diagonals and longitudinals) intersect one another. Force is transmitted from one member to another member at the node 100, thus the node 112 must be able to withstand that transmission of force.

FIG. 2 shows that the members are each a tow 204, or a bundle of untwisted natural or man-made fibers. The fibers can include any desired fiber, such as carbon fiber, fiber glass, etc. For example, the fibers can include T700SC-12K-50C and/or T700SC-24K-50C (Toray) carbon fiber tow pre-impregnated with TCR Composites UF3369-100 resin system. The carbon fiber is approximately 58% fiber by weight and approximately 42% resin by weight. On of skill in the art will understand that whatever fibers are chosen may have the resin pre-impregnated, as above, or the resin may be applied after the fibers are placed. As used in the specification and the claims, the term approximately shall mean that the value is within 10% of the stated value, unless otherwise specified.

FIG. 2 further shows that the fibers of each tow 204 is interwoven at the node 112. That is, in the creation of the composite lattice beam the fibers that form a longitudinal tow and the fibers that form a diagonal tow are interwoven with one another such that the node becomes a weaving of all attached members. Thus, the members at each node are highly secure relative to one another.

Figure 3:
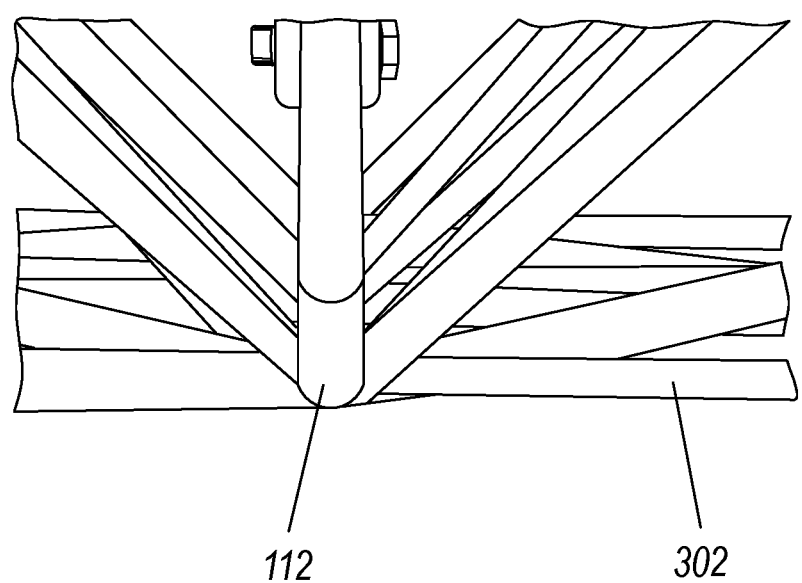
FIG. 3 illustrates the node in preparation for consolidation.

FIG. 3 illustrates the node 112 in preparation for consolidation. Consolidation takes the individual fibers and creates a comprehensive member 202. I.e., consolidation creates a solid from individual fibers that form the member 202. The better the consolidation, the stronger the member 202 will be, and the stronger the composite lattice beam 100 will become.

FIG. 3 shows that upon completion of the winding process, consolidation can be accomplished by applying a wrap 302. The wrap 302 provides radial pressure, forcing each fiber to be in close contact with all immediate members. For example, 1-inch (2.54 cm) wide Dunstone Hi-Shrink tape may be wrapped over each member. During the curing process the heat shrinks the wrap 302, applying radial pressure to the member and consolidating the carbon/epoxy tows. An overlapping pattern in the wrap 302 can provide two or more layers, for example, of wrap 302 over the entire surface area of members 202 and node 112. Other forms of consolidation include vacuum bagging, sewing, silicone expansion, shrink tape, smart tooling, and bladder.

After application of the wrap 302, the members can be cured, for example, in an oven. Thermocouples can be attached at quarter points on inside nodes 112 to monitor the ramp up and curing temperature. The curing procedure can be, for example, based on the requirements for the UF 3369 epoxy resin in the carbon/epoxy pre-impregnated tows. The structures can be heated to a temperature of, for example, 250° F. (121° C.) at standard atmospheric pressure and held for 4 hours, with a ramp-up and ramp-down procedure of no more than 5° F. (2.5° C.) per minute. Curing the resin binds the fibers together. I.e., at the node 112, the fibers become a single inseparable unit that can only be separated by failure of the node. That is, once the resin is cured the node 112 remains together unless sufficient force is applied to cause the node 112 to fail.

Figure 4:
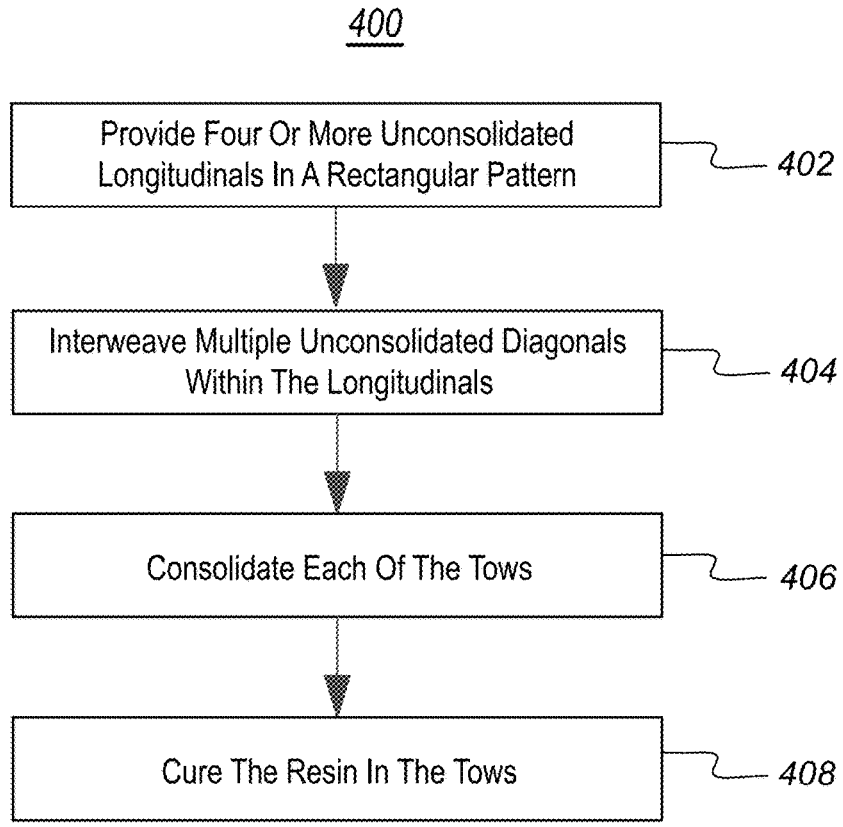
FIG. 4 is a flow chart illustrating a method of manufacturing a composite lattice beam.

FIG. 4 is a flow chart illustrating a method 400 of manufacturing a composite lattice beam. In at least one implementation, the composite lattice beam can be the composite lattice beam 100 of FIGS. 1-3. Therefore, the method 400 will be described, exemplarily, with reference to the composite lattice beam 100 of FIGS. 1-3. Nevertheless, one of skill in the art can appreciate that the method 400 can be used to produce a composite lattice beam other than the composite lattice beam 100 of FIGS. 1-3.

FIG. 4 shows that the method 400 can include providing 402 four or more unconsolidated longitudinals in a rectangular pattern. The longitudinals are straight members which run parallel to the major axis of the composite lattice beam and to one another. I.e., the composite lattice beam can include a rectangular cross-section, with the longitudinals forming the corners (one of skill in the art will understand that the can also run along the faces of the rectangle if more than four longitudinals are present). The longitudinals can be primarily responsible for the bending and axial strength of the composite lattice beam.

FIG. 4 also shows that the method 400 can include interweaving 404 multiple unconsolidated diagonals within the longitudinals. That is, in the creation of the composite lattice beam the fibers that form a longitudinal tow and the fibers that form a diagonal tow are interwoven with one another such that the node becomes a weaving of all attached members. Thus, the members at each node are highly secure relative to one another.

The diagonals vary in two or three dimensions, whereas the longitudinals vary only in a single dimension. I.e., if the longitudinals are defined as parallel to an x-axis then the diagonals are not parallel to any of an x-axis, y-axis or z-axis but may be present entirely in any one of the x-y, y-z or x-z planes (or planes parallel thereto). In addition, the diagonals will always have other diagonals that are not parallel (though one of skill in the art will appreciate that there may also be diagonals that are parallel to one another). The diagonals dominantly carry shear and torsional forces as well as assisting with lateral stability of the longitudinals.

Wherever the interweaving occurs, a node is formed. The nodes are points where the members (longitudinals and the diagonals or multiple diagonals) meet one another. I.e., the nodes are where the longitudinals and the diagonals (or multiple diagonals) intersect with one another. One of skill in the art will appreciate that the nodes need not occur at the edges of bays, but may instead also occur within bays.

Some of the diagonals can be defined as outer diagonals. The outer diagonals are found along the outside "surfaces" (i.e., what would be the surface of the beam if the beam were a rectangular solid with edges formed by the longitudinals). The outer diagonals vary only in two dimensions. I.e., if the longitudinals are defined as parallel to an x-axis, then the outer diagonals are present entirely in any one of the x-y, y-z or x-z planes (or planes parallel thereto). The outer diagonals function primarily to provide lateral stability of the longitudinals.

Some of the diagonals can be defined as inner diagonals. The inner diagonals are found entirely within the interior of the composite lattice beam. The inner diagonals vary in all three dimensions. I.e., if the longitudinals are defined as parallel to an x-axis, then the outer diagonals are not present entirely in any one of the x-y, y-z or x-z planes (or planes parallel thereto). The inner diagonals function primarily to carry shear and torsional forces.

The interweaving pattern can depend on the number of longitudinals used and whether each diagonal should be the same size as other diagonal. For example, if the corners of a rectangle are defined as upper left ("UL"), upper right ("UR"), lower left ("LL") and lower right ("LR") then then outer diagonals be interweaved in a pattern of $UL_1$, $UR_2$, $LR_3$, $LL_4$, repeated (where the subscripts indicate the edges of successive bays—with additional outer diagonals being formed in the patterns of $UR_1$, $LR_2$, $LL_3$, $UL_4$, repeated, etc. and crossing diagonals being formed in the patterns of $UL_1$, $LL_2$, $LR_3$, $UR_4$, repeated, etc.). Alternatively, the outer diagonals can be interweaved in a pattern of $UL_1$, $LL_2$, repeated (with additional outer diagonals being formed in the patterns of $LL_1$, $LR_2$, repeated, etc. and crossing diagonals being formed in the patterns of $UL_1$, $UR_2$, repeated, etc.). The former means that each outer diagonal is the same size whether on the side of the composite lattice beam or on the top or bottom, whereas the latter means that outer diagonals on the side can be made of a different size than diagonals on the top or bottom of the composite lattice beam.

Likewise, the inner diagonal can be interweaved using a pattern of $UL_1$, $LR_2$, repeated (with additional outer diagonals being formed in the patterns of $UR_1$, $LL_2$, repeated, etc.). Alternatively, if additional longitudinals are provided (for example, six each on the top and bottom with midpoints on the top and bottom defined as upper middle ["UM"] and bottom middle ["BM"] respectively) then a different pattern may be used, such as $UL_1$, $LM_2$, $UR_3$, $LM_4$, $UL_5$, repeated.

FIG. 4 further shows that the method 400 can include consolidating 406 each of the tows. Consolidation 406 takes the individual fibers and creates a comprehensive member. I.e., consolidation 406 creates a solid from individual fibers that form the member. The better the consolidation 406, the stronger the member will be, and the stronger the composite lattice beam will become. Consolidation 406 can be accomplished by applying a wrap. The wrap provides radial pressure, forcing each fiber to be in close contact with all immediate members. For example, 1-inch (2.54 cm) wide Dunstone Hi-Shrink tape may be wrapped over each member. During the curing process the heat shrinks the wrap, applying radial pressure to the member and consolidating 406 the carbon/epoxy tows. An overlapping pattern in the wrap can provide two or more layers, for example, of wrap over the entire surface area of members and node.

FIG. 4 additionally shows that the method 400 can include curing 408 the resin in the tows. The members can be cured 408, for example, in an oven. Thermocouples can be attached at quarter points on inside nodes to monitor the ramp up and curing temperature. The curing procedure can be, for example, based on the requirements for the UF 3369 epoxy resin in the carbon/epoxy pre-impregnated tows. The structures can be heated to a temperature of, for example, 250° F. (121° C.) at standard atmospheric pressure and held for 4 hours, with a ramp-up and ramp-down procedure of no more than 5° F. (2.5° C.) per minute. Curing 408 the resin binds the fibers together. I.e., at the node, the fibers become a single inseparable unit that can only be separated by failure of the node. That is, once the resin is cured 408 the node remains together unless sufficient force is applied to cause the node to fail.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A composite lattice beam, the composite lattice beam comprising:
    four or more longitudinals, wherein the four or more longitudinals:
        are parallel to one another;
        comprise the four corners of a rectangle; and
        include a tow, wherein the tow includes a bundle of fibers;
    one or more outer diagonals, wherein the one or more outer diagonals:
        vary in two dimensions; and
        include a tow, wherein the tow includes a bundle of untwisted fibers;
    one or more inner diagonals, wherein the one or more inner diagonals:
        vary in three dimensions; and
        include a tow, wherein the tow includes a bundle of untwisted fibers; and
    one or more nodes, wherein the nodes are each:
        an interweaving of:
            at least one of the four or more longitudinals;
            at least one of the one or more outer diagonals; and
            at least one of the one or more inner diagonals.

2. The composite lattice beam of claim 1 further comprising at least two additional longitudinals, wherein the at least two additional longitudinals:
    are parallel to one another and to the at least four longitudinals;
    are placed at the midpoint between two of the four or more longitudinals; and
    include a tow, wherein the tow includes a bundle of untwisted fibers.

3. The composite lattice beam of claim 1, wherein the tows of the four or more longitudinals, one or more outer diagonals and one or more inner diagonals are all consolidated.

4. The composite lattice beam of claim 1, wherein the fibers of the four or more longitudinals include carbon fibers.

5. The composite lattice beam of claim 1, wherein the fibers of the four or more longitudinals include fiber glass.

6. The composite lattice beam of claim 1, wherein the fibers of the one or more outer diagonals include carbon fibers.

7. The composite lattice beam of claim 1, wherein the fibers of the one or more outer diagonals include fiber glass.

8. The composite lattice beam of claim 1, wherein the fibers of the one or more inner diagonals include carbon fibers.

9. The composite lattice beam of claim 1, wherein the fibers of the one or more inner diagonals include fiber glass.

10. The composite lattice beam of claim 1 further comprising:
    a first bay; and
    a second bay, wherein a first end of the second bay is attached to a first end of the first bay;
    wherein the geometric pattern of the four or more longitudinals, one or more outer diagonals and one or more inner diagonals is repeated from the first bay to the second bay.

11. The composite lattice beam of claim 10 further comprising:
    a third bay, wherein the third bay is attached to a second end of the second bay;
    wherein the second end of the second bay is opposite the first end of the second bay; and
    wherein the geometric pattern of the four or more longitudinals, one or more outer diagonals and one or more inner diagonals is repeated from the first bay to the third bay.

12. A composite lattice beam, the composite lattice beam comprising:
    a first bay; and
    a second bay, wherein a first end of the second bay is attached to a second end of the first bay;
    a first end cap on a first end of the first bay, wherein the first end of the first bay is opposite the second end of the first bay;
    a second end cap on a second end of the second bay, wherein the second end of the second bay is opposite the first end of the second bay;
    a first longitudinal, wherein the first longitudinal:
        extends from the first end cap to the second end cap through the first bay and the second bay; and
        includes a tow, wherein the tow includes a bundle of untwisted fibers intermixed with a resin;
    a second longitudinal, wherein the second longitudinal:
        is parallel to the first longitudinal;
        extends from the first end cap to the second end cap through the first bay and the second bay; and
        includes a tow, wherein the tow includes a bundle of untwisted fibers intermixed with a resin;
    a third longitudinal, wherein the third longitudinal:
        is parallel to each of the first longitudinal and the second longitudinal;
        extends from the first end cap to the second end cap through the first bay and the second bay; and
        includes a tow, wherein the tow includes a bundle of untwisted fibers intermixed with a resin;
    a fourth longitudinal, wherein the fourth longitudinal:
        is parallel to each of the first longitudinal, the second longitudinal and the third longitudinal;
        extends from the first end cap to the second end cap through the first bay and the second bay; and
        includes a tow, wherein the tow includes a bundle of untwisted fibers intermixed with a resin;
    a fifth longitudinal, wherein the fifth longitudinal:
        is parallel to each of the first longitudinal, the second longitudinal, the third longitudinal and the fourth longitudinal;
        extends from the first end cap to the second end cap through the first bay and the second bay; and
        includes a tow, wherein the tow includes a bundle of untwisted fibers intermixed with a resin;

a sixth longitudinal, wherein the sixth longitudinal:
  is parallel to each of the first longitudinal, the second longitudinal, the third longitudinal, the fourth longitudinal and the fifth longitudinal;
  extends from the first end cap to the second end cap through the first bay and the second bay; and
  includes a tow, wherein the tow includes a bundle of untwisted fibers intermixed with a resin;
wherein the first longitudinal, second longitudinal, third longitudinal, fourth longitudinal, fifth longitudinal and sixth longitudinal have a rectangular cross-section, wherein:
  the first longitudinal forms a first corner of the rectangular cross-section;
  the second longitudinal forms a second corner of the rectangular cross-section;
  the third longitudinal forms a third corner of the rectangular cross-section;
  the fourth longitudinal forms a fourth corner of the rectangular cross-section;
  the fifth longitudinal is on a first edge of the rectangular cross-section formed by the first corner and the second corner of the rectangular cross-section; and
  the sixth longitudinal is on a second edge of the rectangular cross-section formed by the third corner and the fourth corner of the rectangular cross-section;
a first outer diagonal, wherein first outer diagonal:
  includes a tow, wherein the tow includes a bundle of untwisted fibers intermixed with a resin;
  extends from a node at the intersection of the first end cap and the first longitudinal to a node at the intersection of the first bay, the second bay and the second longitudinal; and
  passes through the fifth longitudinal;
a second outer diagonal, wherein the second outer diagonal:
  includes a tow, wherein the tow includes a bundle of untwisted fibers intermixed with a resin;
  extends from a node at the intersection of the first end cap and the second longitudinal to a node at the intersection of the first bay, the second bay and the first longitudinal; and
  passes through the fifth longitudinal;
a third outer diagonal, wherein the third outer diagonal:
  includes a tow, wherein the tow includes a bundle of untwisted fibers intermixed with a resin;
  extends from a node at the intersection of the second end cap and the first longitudinal to the node at the intersection of the first bay, the second bay and the second longitudinal; and
  passes through the fifth longitudinal;
a fourth outer diagonal, wherein the fourth outer diagonal:
  includes a tow, wherein the tow includes a bundle of untwisted fibers intermixed with a resin;
  extends from a node at the intersection of the second end cap and the second longitudinal to the node at the intersection of the first bay, the second bay and the first longitudinal; and
  passes through the fifth longitudinal;
a first inner diagonal, wherein the first inner diagonal:
  includes a tow, wherein the tow includes a bundle of untwisted fibers intermixed with a resin; and
  extends from the node at the intersection of the first end cap and the first longitudinal to a node at the intersection of the first bay, the second bay and the sixth longitudinal;
a second inner diagonal, wherein the second inner diagonal:
  includes a tow, wherein the tow includes a bundle of untwisted fibers intermixed with a resin; and
  extends from a node at the intersection of the first end cap and the fifth longitudinal to a node at the intersection of the first bay, the second bay and the third longitudinal;
a third inner diagonal, wherein the third inner diagonal:
  includes a tow, wherein the tow includes a bundle of untwisted fibers intermixed with a resin; and
  extends from the node at the intersection of the first end cap and the fifth longitudinal to a node at the intersection of the first bay, the second bay and the fourth longitudinal;
a fourth inner diagonal, wherein the fourth inner diagonal:
  includes a tow, wherein the tow includes a bundle of untwisted fibers intermixed with a resin; and
  extends from the node at the intersection of the first end cap and the second longitudinal to the node at the intersection of the first bay, the second bay and the sixth longitudinal;
a fifth inner diagonal, wherein the fifth inner diagonal:
  includes a tow, wherein the tow includes a bundle of untwisted fibers intermixed with a resin; and
  extends from a node at the intersection of the first end cap and the third longitudinal to a node at the intersection of the first bay, the second bay and the fifth longitudinal;
a sixth inner diagonal, wherein the sixth inner diagonal:
  includes a tow, wherein the tow includes a bundle of untwisted fibers intermixed with a resin; and
  extends from a node at the intersection of the first end cap and the sixth longitudinal to the node at the intersection of the first bay, the second bay and the first longitudinal;
a seventh inner diagonal, wherein the seventh inner diagonal:
  includes a tow, wherein the tow includes a bundle of untwisted fibers intermixed with a resin; and
  extends from the node at the intersection of the first end cap and the sixth longitudinal to the node at the intersection of the first bay, the second bay and the second longitudinal;
an eighth inner diagonal, wherein the eighth inner diagonal:
  includes a tow, wherein the tow includes a bundle of untwisted fibers intermixed with a resin; and
  extends from a node at the intersection of the first end cap and the fourth longitudinal to the node at the intersection of the first bay, the second bay and the fifth longitudinal;
wherein each node includes an interweaving of all tows that intersect at the node;
wherein each tow and each node are consolidated after interweaving, wherein consolidation of each tow and each node includes:
  applying radial pressure to eliminate gaps between fibers; and
  curing the resin.

13. The composite lattice beam of claim 12 further comprising:
a fifth outer diagonal, wherein fifth outer diagonal:
  includes a tow, wherein the tow includes a bundle of untwisted fibers intermixed with a resin;

extends from the node at the intersection of the first end cap and the third longitudinal to the node at the intersection of the first bay, the second bay and the fourth longitudinal; and
passes through the sixth longitudinal;
a sixth outer diagonal, wherein the sixth outer diagonal:
includes a tow, wherein the tow includes a bundle of untwisted fibers intermixed with a resin;
extends from the node at the intersection of the first end cap and the fourth longitudinal to the node at the intersection of the first bay, the second bay and the third longitudinal; and
passes through the sixth longitudinal;
a seventh outer diagonal, wherein the seventh outer diagonal:
includes a tow, wherein the tow includes a bundle of untwisted fibers intermixed with a resin;
extends from a node at the intersection of the second end cap and the third longitudinal to the node at the intersection of the first bay, the second bay and the fourth longitudinal; and
passes through the sixth longitudinal; and
an eighth outer diagonal, wherein the eighth outer diagonal:
includes a tow, wherein the tow includes a bundle of untwisted fibers intermixed with a resin;
extends from a node at the intersection of the second end cap and the fourth longitudinal to the node at the intersection of the first bay, the second bay and the third longitudinal; and
passes through the sixth longitudinal.

14. The composite lattice beam of claim 12 further comprising:
a fifth outer diagonal, wherein fifth outer diagonal:
includes a tow, wherein the tow includes a bundle of untwisted fibers intermixed with a resin; and
extends from the node at the intersection of the first end cap and the first longitudinal to the node at the intersection of the first bay, the second bay and the third longitudinal;
a sixth outer diagonal, wherein the sixth outer diagonal:
includes a tow, wherein the tow includes a bundle of untwisted fibers intermixed with a resin; and
extends from the node at the intersection of the first end cap and the third longitudinal to the node at the intersection of the first bay, the second bay and the first longitudinal;
a seventh outer diagonal, wherein the seventh outer diagonal:
includes a tow, wherein the tow includes a bundle of untwisted fibers intermixed with a resin; and
extends from a node at the intersection of the second end cap and the third longitudinal to the node at the intersection of the first bay, the second bay and the first longitudinal;
an eighth outer diagonal, wherein the eighth outer diagonal:
includes a tow, wherein the tow includes a bundle of untwisted fibers intermixed with a resin; and
extends from a node at the intersection of the second end cap and the first longitudinal to the node at the intersection of the first bay, the second bay and the third longitudinal.

15. The composite lattice beam of claim 12 further comprising:
a ninth inner diagonal, wherein the ninth inner diagonal:
includes a tow, wherein the tow includes a bundle of untwisted fibers intermixed with a resin; and
extends from a node at the intersection of the second end cap and the first longitudinal to the node at the intersection of the first bay, the second bay and the sixth longitudinal;
a tenth inner diagonal, wherein the tenth inner diagonal:
includes a tow, wherein the tow includes a bundle of untwisted fibers intermixed with a resin; and
extends from a node at the intersection of the second end cap and the fifth longitudinal to the node at the intersection of the first bay, the second bay and the third longitudinal;
an eleventh inner diagonal, wherein the eleventh inner diagonal:
includes a tow, wherein the tow includes a bundle of untwisted fibers intermixed with a resin; and
extends from a node at the intersection of the second end cap and the fifth longitudinal to the node at the intersection of the first bay, the second bay and the fourth longitudinal;
a twelfth inner diagonal, wherein the twelfth inner diagonal:
includes a tow, wherein the tow includes a bundle of untwisted fibers intermixed with a resin; and
extends from a node at the intersection of the second end cap and the second longitudinal to the node at the intersection of the first bay, the second bay and the sixth longitudinal;
a thirteenth inner diagonal, wherein the thirteenth inner diagonal:
includes a tow, wherein the tow includes a bundle of untwisted fibers intermixed with a resin; and
extends from a node at the intersection of the second end cap and the third longitudinal to the node at the intersection of the first bay, the second bay and the fifth longitudinal;
a fourteenth inner diagonal, wherein the fourteenth inner diagonal:
includes a tow, wherein the tow includes a bundle of untwisted fibers intermixed with a resin; and
extends from a node at the intersection of the second end cap and the sixth longitudinal to the node at the intersection of the first bay, the second bay and the first longitudinal;
a fifteenth inner diagonal, wherein the fifteenth inner diagonal:
includes a tow, wherein the tow includes a bundle of untwisted fibers intermixed with a resin; and
extends from a node at the intersection of the second end cap and the sixth longitudinal to the node at the intersection of the first bay, the second bay and the second longitudinal; and
a sixteenth inner diagonal, wherein the sixteenth inner diagonal:
includes a tow, wherein the tow includes a bundle of untwisted fibers intermixed with a resin; and
extends from a node at the intersection of the second end cap and the fourth longitudinal to the node at the intersection of the first bay, the second bay and the fifth longitudinal.

16. The composite lattice beam of claim 12 wherein applying radial pressure to eliminate gaps between fibers includes at least one of:
vacuum bagging;
sewing;
silicone expansion;
shrink tape;
smart tooling; or
a bladder.

17. A method for producing a composite lattice beam, the method comprising:

providing four or more unconsolidated longitudinals in a rectangular pattern, wherein the four or more longitudinals:
are parallel to one another;
comprise the four corners of a rectangle; and
each include a tow, wherein the tow includes a bundle of untwisted fibers intermixed with a resin;
interweaving multiple unconsolidated diagonals with the four or more longitudinals, wherein the multiple unconsolidated diagonals include:
one or more outer diagonals, wherein the one or more outer diagonals:
vary in two dimensions; and
each include a tow, wherein the tow includes a bundle of untwisted fibers intermixed with a resin;
one or more inner diagonals, wherein the one or more inner diagonals:
vary in three dimensions; and
each include a tow, wherein the tow includes a bundle of untwisted fibers; and
wherein each point of interweaving between the longitudinal and one or more of the multiple diagonals forms a node;
consolidating each of the tows and each node after interweaving, wherein consolidating each of the tows and each node includes:
applying a wrap to each of the tows and each node; and
applying heat to the wrap, causing the wrap to shrink;
wherein the shrinkage of the wrap applies radial pressure to eliminate gaps between fibers; and
curing the resin.

18. The method of claim 17, wherein the wrap includes shrink tape.

19. The method of claim 17, wherein each tow includes:
approximately fifty-eight percent carbon fiber by weight; and
approximately forty-two percent resin by weight.

20. The method of claim 17 further comprising:
attaching a thermocouple to a node to monitor a curing temperature.

* * * * *